Oct. 31, 1933.   E. G. GOODELL   1,933,254
BLACK LIQUOR RECOVERY PROCESS AND APPARATUS
Filed March 28, 1932
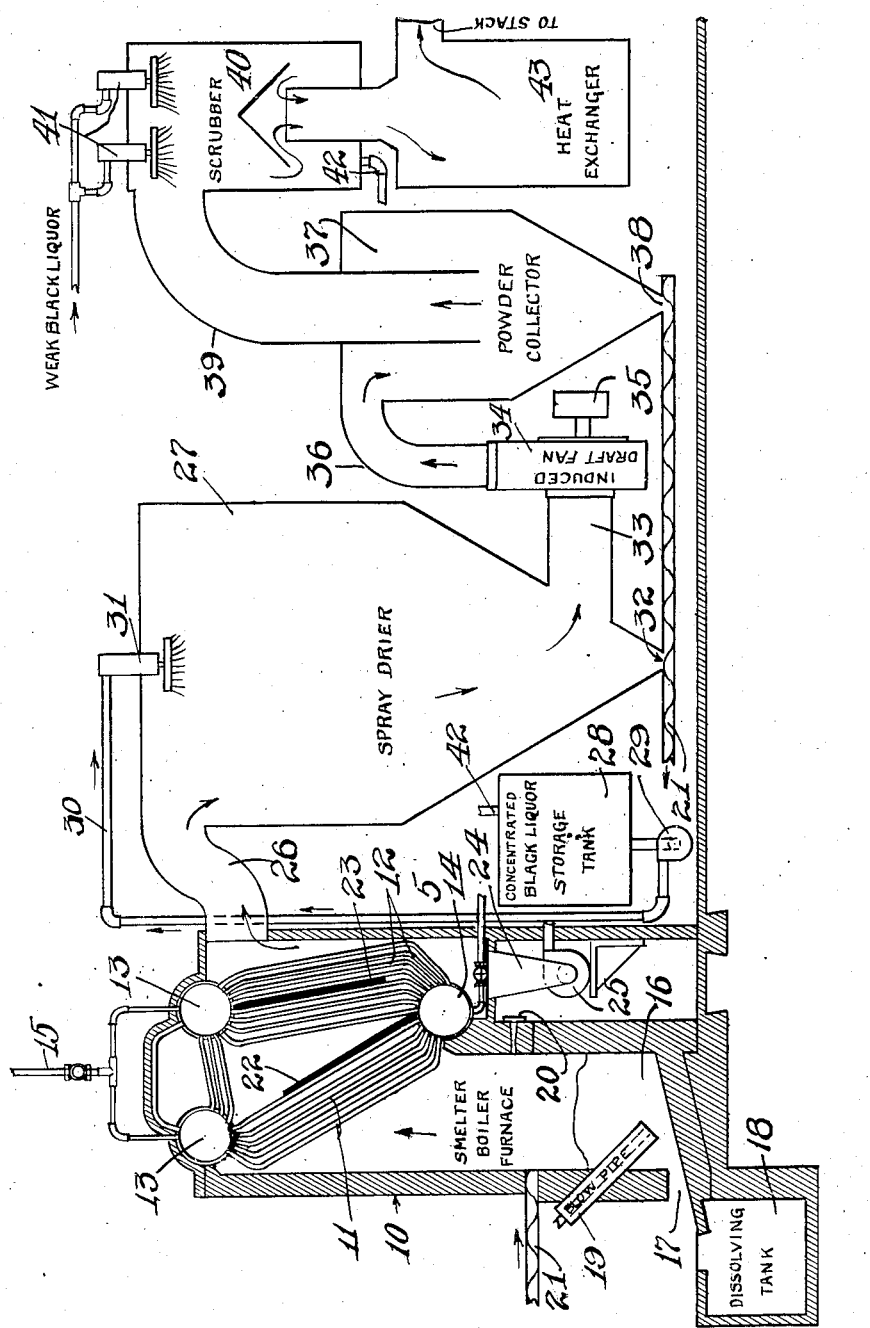
Inventor
Edward G. Goodell Patented Oct. 31, 1933

1,933,254

UNITED STATES PATENT OFFICE 1,933,254

BLACK LIQUOR RECOVERY PROCESS AND APPARATUS

Edward G. Goodell, Stevens Point, Wis.

Application March 28, 1932. Serial No. 601,626

7 Claims. (Cl. 23—48)

This invention relates to a system of apparatus and process of recovering heat and chemical values from the black liquor obtained in the manufacture of paper pulp by the soda and sulfate processes.

More specifically this invention relates to a recovery system wherein the organic and inorganic constituents of black liquor are reclaimed in a highly efficient manner and utilized by freeing the black liquor from its water content in a spray drying chamber and burning the dried black liquor in a combined smelter and boiler furnace unit wherein the heat generated is used to fuse off the sodium compounds in the black liquor and generate steam in the boiler portion of the furnace.

In my United States Letters Patents Nos. 1,779,535; 1,779,536; 1,779,537 and 1,779,768 granted October 28, 1930 there are described, in general, the methods and equipment employed in the manufacture of paper pulp by the soda and sulfate processes. Briefly these operations includes the digestion in a closed digester of cellulose containing materials, such as chipped wood, in the presence of cooking agents such as sodium hydroxide, sodium sulphide, sodium carbonate and the like whereby the cellulose or pulp is freed from lignins, resins and other non-cellulose materials.

After cooking in the digesters the contents are discharged into diffusers, wash tanks and the like wherein the pulp is separated from the residual black liquors. These black liquors contain over 50% of the weights of dry wood cooked and contain the sodium compounds of the original cooking liquors.

Black liquor solids, on a dry basis, have a B. t. u. value of 6500–7000 B. t. u./pound. The economic value of an efficient utilization of the heat content and recovery of the chemicals in the black liquors is therefore obvious.

Processes proposed for recovering the chemicals and utilizing the heat value of black liquor may, in general, be classed as follows:

1. The "rotary incenerator" process, which consists in evaporating in disc evaporators and the like a black liquor which has preferably been somewhat concentrated in steam evaporators. The concentrated black liquor from the disc evaporators is then pumped into a rotary drum or furnace where it is dried and partly burned to form "black ash" by hot gases from a smelting furnace which are passed through the incenerator.

The black ash from the rotary incinerator is dropped into a smelting furnace preferably located directly below the rotating incinerator and burned. The sodium compounds are fused off during the burning operation and recovered. The hot gases from the smelting furnace after passing through the incenerator are used to generate steam.

2. The "spray burning" process, which consists in evaporating the black liquor to a concentration containing 65 to 70% solids and spraying the concentrated black liquor directly into a smelting furnace wherein is effected not only the evaporation of the black liquor but also the combustion of the organic solids and the fusion of the inorganic chemical content. The hot gases leaving the smelting furnace are used to generate steam in a separate boiler unit.

3. The "spray drying" process, which consists in drying the black liquor in finely comminuted form in a heated gaseous medium, preferably the flue gases resulting from combustion of the so sprayed dried black liquor powder in a smelting furnace. In this type of process, as is more fully described in my patents granted October 28, 1930 above referred to, a black liquor powder practically moisture free is formed containing practically all of the organic and sodium compound content of the original black liquor.

In all of the processes referred to, the hot gases obtained in the smelting furnace are passed into a separate unit through interconnecting flues and the like to a boiler unit where they are used to generate steam.

I have now devised a process and apparatus wherein the smelting furnace and steam boiler are one unit. My preferred process, as hereinafter described, includes the production of dried black liquor by a spray drying process but it is to be understood that my invention is not limited to the use of a dried black liquor obtained by any particular method.

It is therefore an object of this invention to provide a single unit apparatus for the burning of dried black liquor, recovery of the sodium compounds contained therein and utilization of the heat of combustion for the generation of steam.

It is another object of this invention to provide a process and apparatus whereby dried black liquor is burned directly below the boiler tubes for the generation of steam from the heat content of the dried black liquor with a minimum of radiation losses.

It is a further object of this invention to provide a process and system of apparatus wherein black liquor is spray concentrated and the concentrated black liquor spray dried in a gaseous medium generated by the burning of other dried black liquor under reducing conditions for the recovery of alkali metal values in a combined smelter-boiler unit designed for the efficient generation of steam.

On the drawing:

The figure shown is a diagrammatical view of a system of apparatus used in my preferred process for recovering heat and chemical values in black liquors.

As shown on the drawing:

The reference numeral 10 indicates a combined smelter furnace and boiler unit having primary boiler tubes 11, secondary boiler tubes 12, water and steam tanks or drums 13 and a mud drum or tank 14. Steam generated in the boiler is circulated from the steam tanks 13 through a pipe line 15.

The boiler tube arrangement described is similar to that used in the Stirling type of boiler but it should be understood that other types of boiler tube arrangements may be used without departing from the scope of the invention.

Dried black liquor is partly burned in a bed 16 at the bottom of the smelting furnace and the sodium compounds fused off through a taphole 17 into a dissolving tank 18 wherein they are prepared into cooking liquors for the digesters and re-used in the preparation of pulp. A water cooled blow pipe 19 supplies sufficient air to the fuel bed 16 to promote combustion of the dried black liquor. The air supply at this point is limited however to maintain reducing conditions so as to prevent any substantial oxidation of the sodium-sulphur compounds being fused out. If necessary additional air may be supplied through nozzles 20 located above the fuel bed zone. The introduction of air at this point creates a secondary combustion zone which insures complete oxidation and burning of the organic materials of the black liquor.

Dried black liquor powder or solids from any source are fed to the furnace through a spiral conveyor inlet 21 located above the fuel bed. In my preferred practice, as hereinafter more fully described, the black liquor powder is obtained from a spray drier and powder collector.

In the drawing the burning gases from the fuel bed pass around the boiler tubes 11, over a baffle plate 22, then around the secondary boiler tubes 12, and under a baffle 23. At this point the gases are in a less turbulent state than when first leaving the fuel bed and the unburned black liquor powders carried along together with any fused sodium salts tend to drop down through a duct 24. It should be understood however that any type of steam boiler may be used and that the above description is specific to a particular type of boiler merely because such an installation has been in actual use. A fan 25 blows these solid particles into the powder collector or drier hereinafter described.

After passing between the boiler tubes the gases pass out of the smelter boiler furnace through a duct 26 into a spray drier 27. Concentrated black liquor having a solid content of about 50 to 55% is pumped from a storage tank 28 by a pump 29 through a pipe line 30 to an atomizer 31 by which atomizer it is sprayed in finely divided form to the interior of the drying chamber 27. The flue gases entering through duct 26 effect substantial dehydration of the atomized black liquor. Part of the resulting dried powder falls into the spiral conveyor 21 at 32. The balance of the dried black liquor and all of the flue gases (which are now somewhat moisture laden) are drawn through a duct 33 by an induced draft fan 34 driven through a pulley 35, or any source of motive power.

From the fan 34 the gas and powder mixture is blown through a duct 36 into a powder separator 37 of the cyclone or other type. The dried black liquor powder is herein separated from the flue gases and falls into the spiral conveyor 21 at 38. Powder collected in the spiral conveyor 21 at 32 and 38 is fed into the furnace 10 by any convenient method.

The flue gases from the powder collector 37 are next passed through a duct 39 into a scrubber 40 wherein their remaining drying capacity is utilized to concentrate weak black liquor to a sufficient solid content so as to render it suitable for spraying into the drying chamber 27. The weak black liquor, which has preferably been somewhat concentrated in steam evaporators, is sprayed into scrubber 40 by atomizers 41. The sprayed liquor after passing through the scrubber 40 may be fed to the storage tank 28 through a pipe line 42.

The flue gases after passing through the scrubber 40 are substantially saturated with water due to their evaporative function in drier 27 and in the scrubber 40. These gases still have a sensible and latent heat content which is now reclaimed by means of a heat exchanger 43 into which the gases are directed from the scrubber. The function of the heat exchanger may be to heat feed water for the boiler 10, as a heater for black liquor or for any other purpose. After passing through the heat exchanger the spent flue gases are allowed to pass up a stack (not shown) to the atmosphere.

A comparison of my preferred process with the three types of processes described above shows it is of the spray drying type but contains many improvements over methods of this type heretofore produced. It is an essential and novel feature of my process to produce a maximum amount of steam by utilizing the dried black liquor directly as a means for generating the steam before loss of heat values from any previous or concurrent use of the gases in an evaporating or drying capacity occurs. According to my process, any steps in the concentration or drying of the black liquor proceed subsequently to the generation of steam by means of the heat content of the flue gases incident to the production of such steam. Further substantially all of the radiant heat of the burning solids is directly utilized for the generation of steam.

From the above description it will be seen that my process differs from heretofore proposed waste heat recovery methods and results in a highly efficient production of steam because:

1. A dried black liquor substance is burned in the smelting furnace.

2. The dried black liquor substance is produced by a method which is not destructive to either the organic or inorganic content of the black liquor.

3. The construction of the smelter-boiler unit is such that the maximum heating value of the burning dried black liquor is absorbed by the boiler tubes.

4. The combustion of the dried black liquor powder will proceed without concurrent evaporation of moisture from the black liquor as in the spray burning process. This, of course, increases the production of steam.

5. The black liquor substance has not lost its organic or inorganic values through partial combustion or distillation such as takes place in the rotary incinerator process.

6. The remaining heat value of the flue gases, after production of steam, is practically all used in direct heat evaporation in the drier and scrubber.

In the claims below by the term "alkaline treatment" as used in connection with the manufacturing of pulp, I mean those processes known to the paper art in the digestion of cellulose material as soda, sulphate, and modifications of these processes.

The term "alkali metal values" used in the claims refers to those alkali metal compounds dissolved in the original cooking liquor such as sodium hydroxide, sodium sulphide and the like.

I am aware that many changes may be made and numerous details of my process may be varied through a wide range without departing from the principles of this invention, and I, therefore, do not purpose limiting the patent granted hereon otherwise than necessitated by the prior art.

I claim as my invention:

1. In the recovery of alkali metal values and the utilization of heat content of black liquor produced in the manufacture of pulp from cellulose bearing materials, the steps of introducing into a smelting furnace the solids of black liquor in substantially dry condition, burning said solids under reducing conditions, fusing off the alkali metal values, supplying additional air to the combustion gases directly above the fuel bed and completely burning the gases above the fuel bed directly under a steam boiler unit mounted above the smelting furnace.

2. In the process of utilizing the heat value in black liquor obtained in the manufacture of paper pulp, the steps which comprise delivering to a smelting furnace-boiler unit black liquor solids in substantially dry condition, admitting a limited amount of air for partial combustion close to the bottom of said smelting furnace, adding additional air to complete combustion at a point substantially above the top surface of the furnace bed and delivering the heated gases of said combustion to a steam boiler position directly above the smelting furnace within the same unit.

3. In a boiler furnace for the recovery of alkali metal values and utilization of the heat content of black liquors obtained from the manufacture of paper pulp, a fuel bed portion, a fluid cooled blow-pipe projecting into said portion, a feed for dried black liquor located above the fuel bed portion, air nozzles above said dried liquor feed, and a steam boiler unit directly above said furnace, a single enclosure housing both the steam boiler unit and the furnace.

4. In the process of regenerating the active constituents of black liquor, the steps which comprise burning substantially moisture free black liquor solids under reducing conditions and substantially completely burning the volatilized and gaseous products from said partial combustion under oxidizing conditions directly under steam generating means located above the fuel bed prior to the utilization of the heat of said gaseous combustion products for any direct evaporization, whereby the radiant heat of said burning solids and the sensible heat of said gases are directly and primarily available for the generation of steam.

5. In the process of recovering alkaline values from black liquor and efficiently utilizing the heat content of said liquor the steps which comprise introducing a dried black liquor powder into a boiler furnace just above a fuel bed composed of said powder in a burning state, supplying an amount of air to said fuel bed sufficient to maintain combustion but not sufficient to permit an oxidizing atmosphere in said zone, creating a secondary combustion zone by introducing air to the furnace above the point of entry of the dried black liquor and allowing the hot gases of combustion to arise into direct contact with the boiler tubes within the furnace for the generation of steam.

6. A combined smelter and steam generator for the recovery of alkaline values and utilization of heat content in dried black liquor which comprises a housing defining an upper combustion zone and a lower reducing zone, boiler tubes in said upper zone, a feed for black liquor powder near the top of said reducing zone, a blow pipe opening near the bottom of said reducing zone, and air nozzles in the furnace above said black liquor powder feed line to furnish sufficient air for complete combustion of the rising burning gases.

7. A combined smelter and steam generator for the recovery of alkaline values and efficient utilization of heat content in black liquor which comprises a housing, a fuel bed zone at the bottom of said housing, an inclined base for said fuel bed, a tap hole for removal of molten alkaline values in the lower end of said base, a blow pipe in said fuel bed for supplying a limited amount of air thereto, a screw conveyor above said fuel bed for feeding black liquor solids directly thereto, air nozzles above said screw conveyor, primary and secondary boiler tubes substantially above said air nozzles within said housing, a baffle plate separating said primary tubes from said secondary tubes, means at the bottom of said secondary boiler tubes for removing unburned black liquor powders entrained in the burning gases, and means for directing the gases from the boiler furnace to additional apparatus for utilization of their remaining heat content.

EDWARD G. GOODELL.